United States Patent
Guichard et al.

(10) Patent No.: US 7,613,826 B2
(45) Date of Patent: Nov. 3, 2009

(54) METHODS AND APPARATUS FOR PROVIDING MULTIPLE POLICIES FOR A VIRTUAL PRIVATE NETWORK

(75) Inventors: James N. Guichard, Groton, MA (US); W. Scott Wainner, Potomac Falls, VA (US); Brian E. Weis, San Jose, CA (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 11/350,991

(22) Filed: Feb. 9, 2006

(65) Prior Publication Data

US 2007/0186009 A1    Aug. 9, 2007

(51) Int. Cl.
*G06F 15/16* (2006.01)
(52) U.S. Cl. .................. 709/238; 709/227; 713/153
(58) Field of Classification Search ......... 709/200–203, 709/217–227, 238; 713/153, 154
See application file for complete search history.

(56) References Cited

U.S. PATENT DOCUMENTS

| | | | |
|---|---|---|---|
| 6,823,462 B1 * | 11/2004 | Cheng et al. .................. 726/15 |
| 7,353,533 B2 * | 4/2008 | Wright et al. .................. 726/1 |
| 7,509,491 B1 | 3/2009 | Wainner et al. ............. 713/163 |
| 2003/0154399 A1 * | 8/2003 | Zuk et al. ..................... 713/201 |
| 2004/0022258 A1 * | 2/2004 | Tsukada et al. ............. 370/401 |
| 2004/0083386 A1 * | 4/2004 | Marquet et al. ............. 713/201 |
| 2004/0225895 A1 * | 11/2004 | Mukherjee et al. .......... 713/201 |
| 2005/0055579 A1 * | 3/2005 | Kanda et al. ................. 713/201 |
| 2005/0088977 A1 * | 4/2005 | Roch et al. .................... 370/254 |
| 2005/0198306 A1 * | 9/2005 | Palojarvi et al. ............ 709/227 |
| 2006/0198368 A1 | 9/2006 | Guichard et al. ............. 370/389 |

OTHER PUBLICATIONS

Rosen, et al., "BGP/MPLS VPNs," Mar. 1999, available at http://tools.ieft.org/rfc/rfc2547.txt on Jul. 29, 2009 (24 pgs.).

* cited by examiner

*Primary Examiner*—Moustafa M Meky
(74) *Attorney, Agent, or Firm*—Brinks Hofer Gilson & Lione (57) ABSTRACT

A system provides a request for a policy from a policy server, and receives the policy from the policy server. The policy indicates processing to be applied to a traffic partition passing through the device. The system configures the policy within a routing structure associated with the traffic partition for the policy in the device, and routes a stream of traffic for the routing structure in accordance with the policy for that routing structure.

18 Claims, 7 Drawing Sheets

204 PROVIDE A REQUEST FOR THE POLICY FROM A POLICY SERVER

205 NOTIFY THE POLICY SERVER OF THE PRESENCE OF THE DEVICE

206 NOTIFY THE POLICY SERVER THAT THE DEVICE IS ACTIVE

207 RECEIVE AN AUTHENTICATION MESSAGE FROM THE POLICY SERVER

208 RESPOND TO THE AUTHENTICATION MESSAGE FROM THE POLICY SERVER

*FIG. 5*

209 RECEIVE THE POLICY FROM THE POLICY SERVER, THE POLICY INDICATING PROCESSING TO BE APPLIED TO THE TRAFFIC PARTITION PASSING THROUGH THE DEVICE

210 RECEIVE A POLICY DEDICATED TO THE PLURALITY OF TRAFFIC PARTITIONS

OR

211 RECEIVE THE POLICY FROM AT LEAST ONE POLICY SERVER OF THE PLURALITY OF POLICY SERVERS

212 RECEIVE AT LEAST ONE POLICY FROM THE PLURALITY OF POLICIES, THE AT LEAST ONE POLICY RECEIVED FROM AT LEAST ONE POLICY SERVER OF THE PLURALITY OF POLICY SERVERS

213 PROVIDE AN IDENTITY OF THE DEVICE ONTO THE NETWORK TO ALLOW THE PLURALITY OF POLICY SERVERS TO RECEIVE THE IDENTITY OF THE DEVICE TO DETERMINE WHETHER THE PLURALITY OF POLICY SERVERS HAVE AT LEAST ONE POLICY FROM THE PLURALITY OF POLICIES FOR THAT DEVICE

214 IN RESPONSE, PROVIDE THE AT LEAST ONE POLICY FOR THAT DEVICE TO THE DEVICE, WHEN THE IDENTITY OF THE DEVICE IS ASSOCIATED WITH THE AT LEAST ONE POLICY FROM THE PLURALITY OF POLICIES

METHODS AND APPARATUS FOR PROVIDING MULTIPLE POLICIES FOR A VIRTUAL PRIVATE NETWORK

BACKGROUND

Virtual Private Networks (i.e., VPNS) provide a secured means for transmitting and receiving data between network nodes even though many users share a corresponding physical network supporting propagation of the data. The data transmitted between such network nodes (e.g., edge nodes of a service provider network) may or may not be encrypted to protect against eavesdropping and tampering by unauthorized parties. Because the physical network is shared, costs of using resources are generally reduced for each of many users. A typical arrangement involves customer edge (CE) routers communicating via the Internet (or shared backbone) between local area networks (LANs), that the respective edge routers protect. The edge routers establish secure, encrypted links between each other to protect the trusted LANs in the VPN.

A physical network such as a service provider network topology, therefore, may include peripherally located provider edge (PE) routers, each of which couples to one or multiple customer edge (CE) routers. The customer edge routers, in turn, may couple to private local area networks (LANs) associated with one or multiple VPNs. To support operation, the service provider's PE routers typically maintain Virtual Routing and Forwarding (VRF) information dictating how to route and forward traffic through the shared physical network to support corresponding VPNs for the different customer departments. Typically, the service provider network selectively couples the local area networks to each other through links created between its PE routers.

Dynamic Group VPNs (DGVPN) provide a scalable method for large-scale encryption between endpoints within a network based VPN environment. DGVPN provides for encryption within a single VPN partition in the sense that all sites of a VPN may participate in the encryption services, and the operator of the VPN bases this on the configuration. It also provides the necessary machinery in which to define multiple "groups" within a VPN so that different security policies may be applied to each group.

A VPN with multiple "groups" defined within it is sometimes called a "partitioned VPN".

SUMMARY

Conventional technologies for providing policies within a VPN suffer from a variety of deficiencies. In particular, conventional technologies for providing policies within a VPN are limited in that there does not exist a solution for providing policies (i.e., encryption) across partitioned VPN segments within the same customer environment. Conventional technologies that provide encryption between end-points within the VPN segment suffer from scalability constraints. Conventional technologies that assume all the VPN segments conform to a common security policy do not provide the ability to provide multiple policies across partitioned VPN segments.

Embodiments disclosed herein significantly overcome such deficiencies and provide a system that includes a policy providing process that allows a group member (i.e., a network device) to obtain policies from a policy server that are applied to different groups within the partitioned VPN segments. In one embodiment, group members can obtain a distinct policy from a policy server dedicated to providing that distinct policy. In another embodiment, group members can obtain a distinct policy from a common (i.e., shared) policy server providing multiple policies. In yet another embodiment, group members can obtain a shared policy from a common (i.e., shared) policy server. It should be noted that the term VPN can also be construed as one of the partitions within the VPN, as described above.

Embodiments disclosed herein provide a system that includes a policy providing process that provides a request for the policy from a policy server, and receives the policy from the policy server. The policy indicates processing to be applied to a traffic partition (i.e., a VPN) passing through the network device (i.e., group member). The policy providing process configures security functions applied to data forwarded within a routing structure (such as a virtual routing and forwarding instance), associated with the traffic partition for the policy in the device. The policy providing process residing on the network device routes and encrypts a stream of traffic for the routing structure in accordance with the policy for that routing structure.

During an example operation of one embodiment, suppose a group member (i.e., a network device) requires policies to provide security processing for each of the traffic partitions (i.e., VPNs) associated with the group member. The group member requests the policies from a shared policy server. The group member notifies the policy server of the presence of the group member, and also notifies the policy server that the group member is 'active'. In response, the group member receives an authentication message from the policy server, and responds to the authentication message. Once authenticated, the group member receives the policies (for each of the VPNs associated with the group member) from the shared policy server. The group member configures the virtual routing and forwarding instance (VRF) associated with the respective VPNs with the received policies, and routes all traffic coming through the group member in accordance with the security processing provided by the policies.

During another example operation of one embodiment, suppose a group member (i.e., a network device) requires policies to provide security processing for each of the traffic partitions (i.e., VPNs) associated with the group member. The group member sends a message to all of the policy servers, notifying the policy servers of the traffic partitions contained within that device. The group member notifies the policy servers of the presence of the group member, and also notifies the policy server that the group member is 'active'. In response, the group member receives an authentication message from each policy server, and responds to those authentication messages. Once authenticated, the group member receives the policies (for each of the VPNs associated with the group member) from the policy servers. The group member receives, from each policy server, those policies that the respective policy servers provide that correspond to the traffic partitions contained within the requesting device. The group member configures the virtual routing and forwarding instance (VRF) associated with the respective VPNs with the received policies, and routes all traffic coming through the group member in accordance with the security processing provided by the policies.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a system that includes a policy providing process that allows a group member (i.e., a network device) to obtain policies from a policy server. In one embodiment, group members can obtain a distinct policy from a policy dedicated to providing that distinct policy. In another embodiment, group members can obtain a distinct policy from a common (i.e., shared) policy server providing multiple policies. In yet another embodiment, group members can obtain a shared policy from a common (i.e., shared) policy server. In yet another embodiment, the policy providing process provides an identity of the device (i.e., the group member) onto the network to allow the plurality of policy servers to receive the identity of the device to determine whether the plurality of policy servers have at least one policy for that device.

Embodiments disclosed herein provide a system that includes a policy providing process that provides a request for the policy from a policy server, and receives the policy from the policy server. The policy indicates processing to be applied to a traffic partition (i.e., a VPN) passing through the network device (i.e., group member). The policy providing process configures the received policy within a routing structure (such as a virtual routing and forwarding instance), associated with the traffic partition for the policy in the device. The policy providing process routes a stream of traffic for the routing structure in accordance with the policy for that routing structure.

Figure 1:
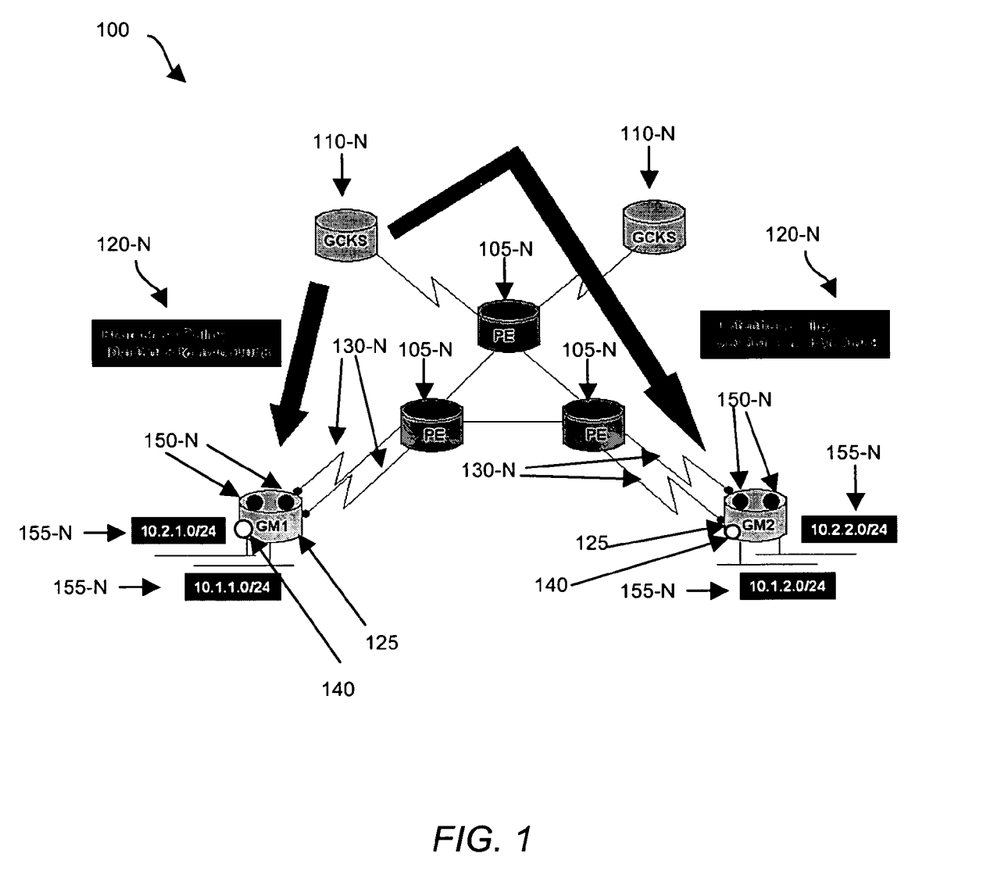
FIG. 1 shows a high level view of a network wherein a common policy server provides policies, according to one embodiment disclosed herein.

FIG. 1 illustrates an example computer-networking environment 100 suitable for use in explaining example embodiments disclosed herein. The computer-networking environment 100 includes policy servers 110-N (providing policies 120-N to devices 125) and provider edge (PE) routers 105-N. The policies contain address ranges 155-N for the traffic partitions 130-N traveling through the devices 125. The policy providing process 140 resides on each device 125, along with routing structures 150-N for each respective traffic partition 130-N.

Figure 2:
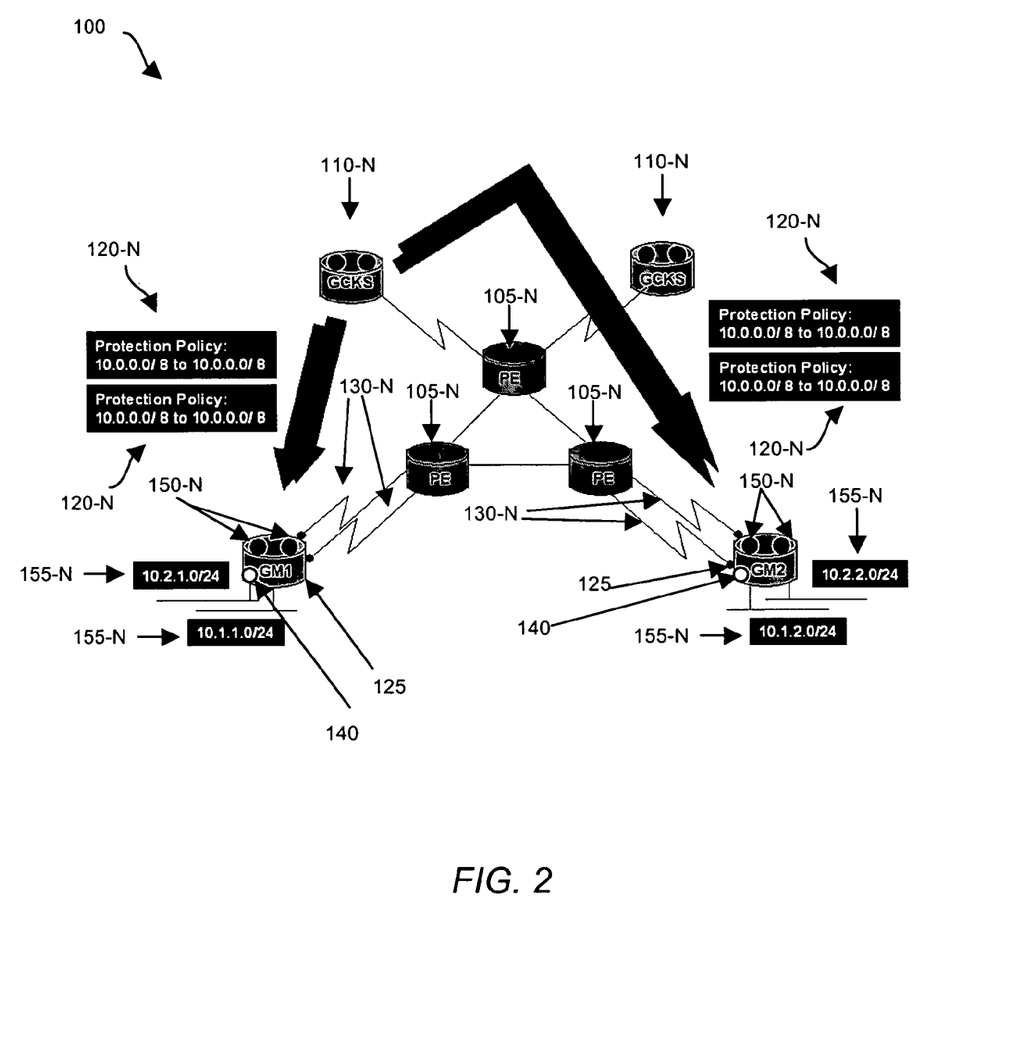
FIG. 2 shows a high level view of a network wherein a common policy server provides distinct policies, according to one embodiment disclosed herein.

FIG. 2 illustrates an example computer-networking environment 100 suitable for use in explaining example embodiments disclosed herein. The computer-networking environment 100 includes policy servers 110-N (providing policies 120-N to devices 125) and provider edge (PE) routers 105-N. The policies contain address ranges 155-N for the traffic partitions 130-N traveling through the devices 125. The policy providing process 140 resides on each device 125, along with routing structures 150-N for each respective traffic partition 130-N. FIG. 2 depicts a common policy server 110-1 providing distinct policies 120-N to the devices 125.

Figure 3:
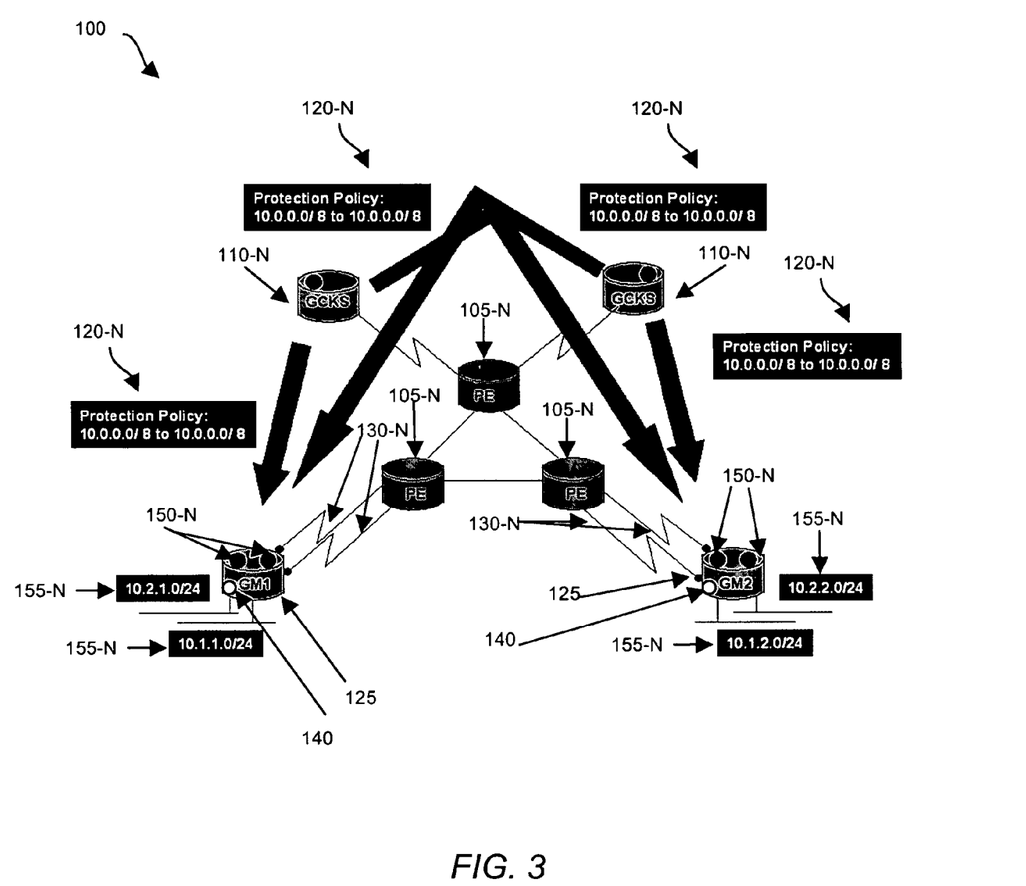
FIG. 3 shows a high level view of a network wherein distinct policy servers provide distinct policies, according to one embodiment disclosed herein.

FIG. 3 illustrates an example computer-networking environment 100 suitable for use in explaining example embodiments disclosed herein. The computer-networking environment 100 includes policy servers 110-N (providing policies 120-N to devices 125) and provider edge (PE) routers 105-N. The policies contain address ranges 155-N for the traffic partitions 130-N traveling through the devices 125. The policy providing process 140 resides on each device 125, along with routing structures 150-N for each respective traffic partition 130-N. FIG. 3 depicts distinct policy servers 110-N providing distinct policies 120-N to the devices 125.

Further details of configurations explained herein will now be provided with respect to a flow chart of processing steps that show the high level operations disclosed herein.

Figure 4:
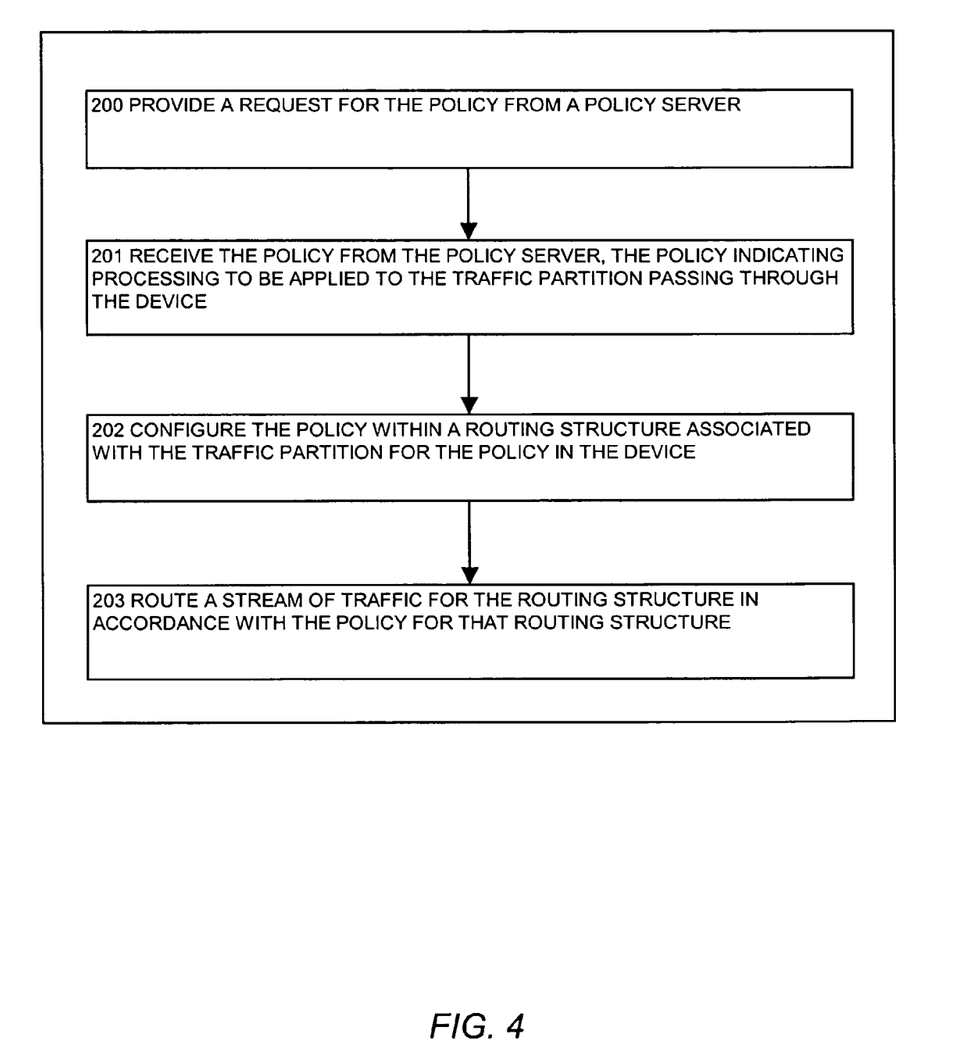
FIG. 4 illustrates a flowchart of a procedure performed by the system of FIG. 1 when the policy providing process provides a request for the policy from a policy server, and receives the policy, according to one embodiment disclosed herein.

FIG. 4 is a flowchart of the steps performed by the policy providing process when it provides a request for the policy 120-N from a policy server 110-N, and receives the policy 120-N from the policy server 110-N.

In step 200, the policy providing process 140 provides a request for the policy 120-N from a policy server 110-N. In an example configuration, a device 125, requiring a distinct policy 120-N for a traffic partition 130-N associated with the device 125-N, provides a request for that distinct policy 120-N from a policy server 110-N dedicated to providing that distinct policy 120-N. For example, a group member (i.e., a device 125) requests a policy 120-N (i.e., a security policy) for a virtual private network (VPN) (i.e., a traffic partition 130-N) associated with the group member (i.e., a device 125). In other words, the device 125 requests a policy 120-1 from the policy server 110-1 dedicated to providing the policy 120-1.

In step 201, the policy providing process 140 receives the policy 120-N from the policy server 110-N. The policy 120-N indicates security processing to be applied to the traffic partition 130-N passing through the device 125. In an example configuration, the policy providing process 140 resides on the device 125, and receives the policy 120-N (for a traffic partition 130-N associated with the device 125) from the policy server 110-N.

In step 202, the policy providing process 140 configures the policy 120-N (i.e., a security policy) within a routing structure 150-N associated with the traffic partition 130-N for the policy 120-N in the device 125. In an example configuration, the routing structure 150-N is a virtual routing and forwarding instance. The policy providing process 140 configures the policy 120-N within the virtual routing and forwarding instance (i.e., the routing structure 150-N) on the device 125 according to the policy 120-N received from the policy server 110-N.

In step 203, the policy providing process 140 routes a stream of traffic for the routing structure 150-N in accordance with the policy 120-N for that routing structure 150-N. In an example configuration, the traffic partition 130-N is a Virtual Private Network (VPN), and the policy providing process 140 routes the traffic through the VPN (i.e., the traffic partition 130-N) according to the policy 120-N provided by the policy server 110-N.

Figure 5:
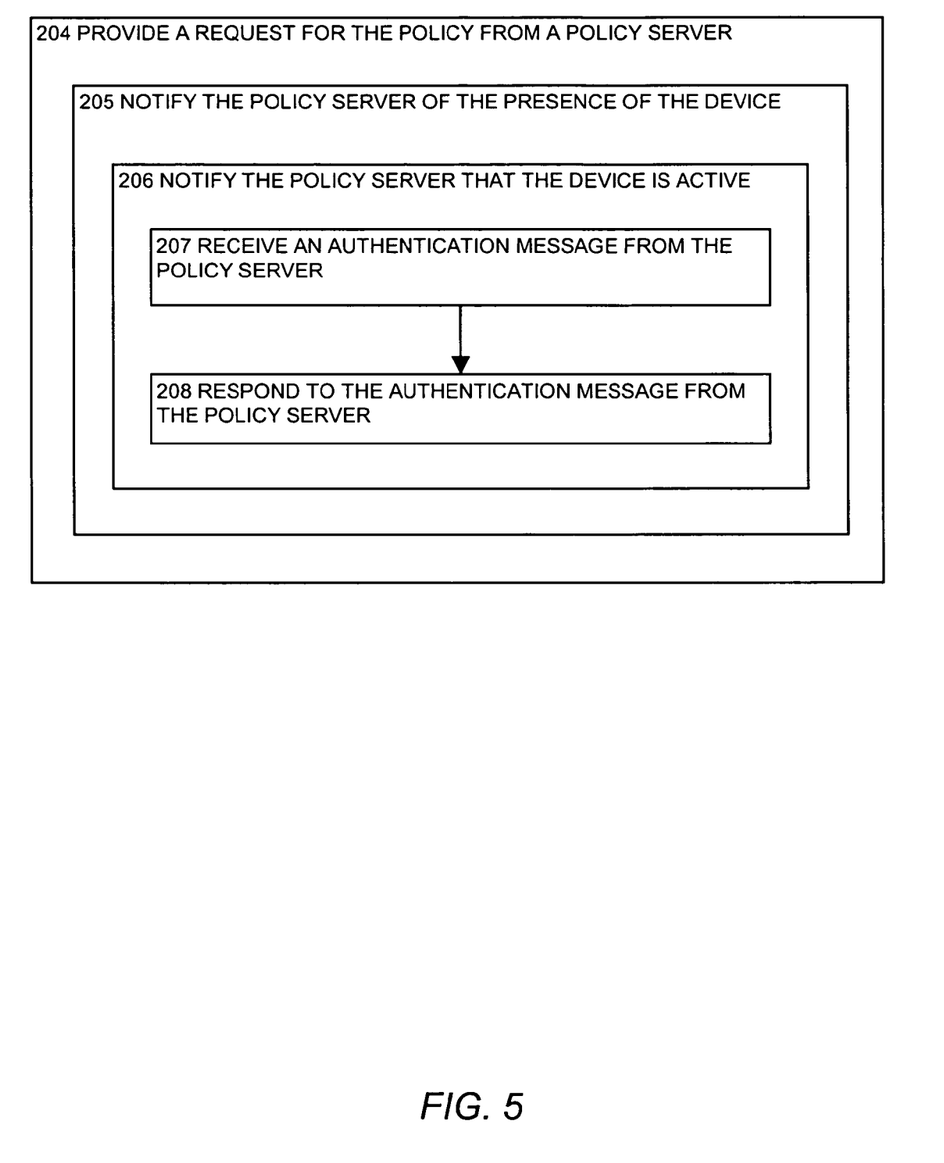
FIG. 5 illustrates a flowchart of a procedure performed by the system of FIG. 1 when the policy providing process provides a request for the policy from a policy server, and performs an authentication with the policy server, according to one embodiment disclosed herein.

FIG. 5 is a flowchart of the steps performed by the policy providing process 140 when it provides a request for the policy 120-N from a policy server 110-N, and notifies the policy server 110-N of the presence of the device 125.

In step 204, the policy providing process 140 provides a request for the policy 120-N from a policy server 110-N. In an example configuration, a device 125, requiring a distinct policy 120-N for a traffic partition 130-N associated with the device 125-N, provides a request for that distinct policy 120-N from a policy server 110-N dedicated to providing that distinct policy 120-N. For example, a group member (i.e., a device 125) requests a policy 120-N (i.e., a security policy) for a virtual private network (VPN) (i.e., a traffic partition 130-N) associated with the group member (i.e., a device 125). In other words, the device 125 requests a policy 120-1 from the policy server 110-1 dedicated to providing the policy 120-1.

In step 205, the policy providing process 140 notifies the policy server 110-1 of the presence of the device 125. In an example configuration, the policy providing process 140 resides on each device 125 (i.e., group member) in the network. On each device 125 (i.e., group member), the policy providing process 140 notifies the policy server 110-1 (or multiple policy servers 110-N) of the presence of that particular device 125 (i.e., group member).

In step 206, the policy providing process 140 notifies the policy server 110-1 that the device 125 is active. In an example configuration, the policy providing process 140 notifies the policy server 110-1 that the device 125 exists on the network and is alive, that is, capable of receiving policies 120-N from the policy server 110-1.

In step 207, the policy providing process 140 receives an authentication message from the policy server 110-1. In an example configuration, the policy providing process 140 notifies the policy server 110-1 that the device 125 is capable of receiving policies 120-N from the policy server 110-1 by performing an authentication process with the policy server 110-1. This authentication process begins with the policy providing process 140 receiving an authentication message from the policy server 110-1.

In step 208, the policy providing process 140 responds to the authentication message from the policy server 110-N. The policy providing process 140 responds to the authentication message from the policy server 110-N to verify that the device 125 is active on the network and capable of receiving policies 120-N from the policy server 110-1. When the authentication process has successfully been completed between the device 125 and the policy server 110-1, the device 125 is ready to receive the policy 120-N from the policy server 110-N.

Figure 6:
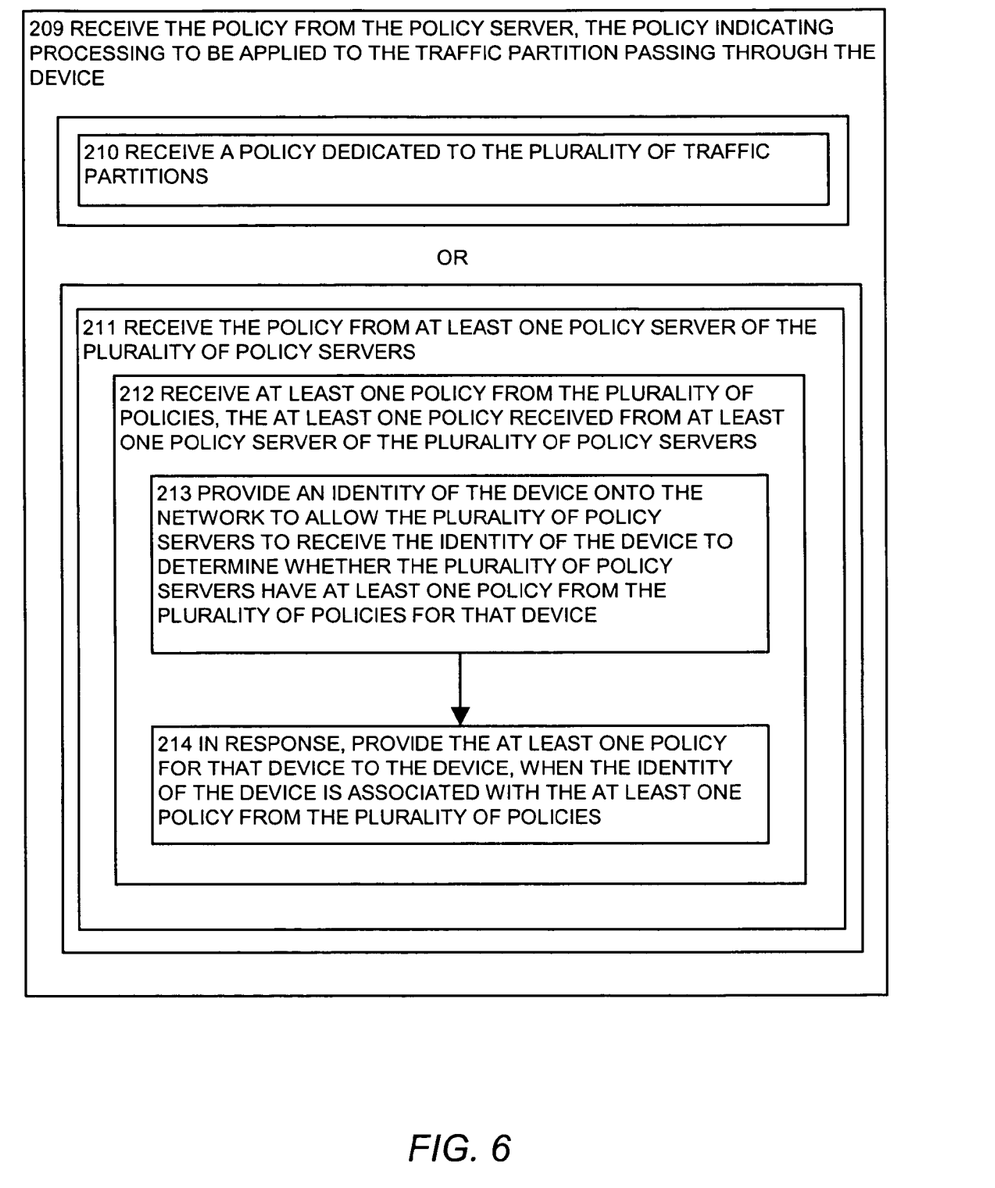
FIG. 6 illustrates a flowchart of a procedure performed by the system of FIG. 3 when the policy providing process receives the policy from the policy server, the policy indicating processing to be applied to the traffic partition passing through the device, according to one embodiment disclosed herein.

FIG. 6 is a flowchart of the steps performed by the policy providing process 140 when it receives the policy 120-N from the policy server 110-1. The policy indicates processing to be applied to the traffic partition 130-N passing through the device 125.

In step 209, the policy providing process 140 receives the policy 120-1 from the policy server 110-N. The policy 120-1 indicates processing to be applied to the traffic partition 130-N passing through the device 125. In an example configuration, the policy providing process 140 resides on the device 125, and receives the policy 120-1 (for a traffic partition 130-N associated with the device 125) from the policy server 110-N.

In step 210, the policy providing process 140 receives a policy 120-1 dedicated to the plurality of traffic partitions 130-N. In an example configuration, the policy providing process 140 receives a policy 120-1 that can be applied to one or more traffic partitions 130-N. In an example configuration, for each traffic partition 130-1, the respective routing structure 150-1 relies upon a globally shared secured interface that connects to a common backbone with a shared policy 120-1 and shared policy server 110-1. The shared policy server 110-1 must use a unique policy 120-1 for each routing structure 150-1 (associated with the respective traffic partitions 130-1) where the policy 120-1 is defined by the protection of the source and destination addresses.

Alternatively, in step 211, the policy providing process 140 receives the policy 120-1 from at least one policy server 110-1 of the plurality of policy servers 110-N. In an example configuration, a policy 120-1 can be obtained from more than one policy server 110-N. For example policy server 110-1 and policy server 110-2 can both supply policy 120-1 to the device 125. In this example, the policy providing process 140 receives the policy 120-1 from at least one policy server 110-1 of the plurality of policy servers 110-N capable of providing the policy 120-1.

In step 212, the policy providing process 140 receives at least one policy 110-1 from the plurality of policies 110-N. The policy 110-1 is received from at least one policy server 120-1 of the plurality of policy servers 120-N. In an example configuration, a policy 120-1 can be obtained from more than one policy server 110-N, and each of those policy servers 110-N can provide multiple policies 120-N. In this example, the policy providing process 140 can receive more multiple policies 120-N from at least one policy server 110-1 of the plurality of policy servers 110-N capable of providing those policies 120-N.

In step 213, the policy providing process 140 provides an identity of the device 125 onto the network to allow the plurality of policy servers 110-N to receive the identity of the device 125 to determine whether the plurality of policy servers 110-N have at least one policy 120-1 from the plurality of policies 120-N for that device 125. In an example configuration, the policy providing process 140 provides the identity of the device 125 onto the network, and in return, receives information from the policy servers 110-N regarding which policies 120-N each policy server 110-N can provide to the device 125 that correspond to the traffic partitions 130-N that travel through the device 125.

In response, in step 214, the policy providing process 140 provides the at least one policy 120-1 for that device 125 to the device 125, when the identity of the device 125 is associated with the at least one policy 120-1 from the plurality of policies 120-N. In an example configuration, the policy providing process 140 provides the identity of the device 125 onto the network (to the plurality of policy servers 110-N), and in return, receives at least one policy 120-1 (from at least one policy server 110-1) for the device 125.

Figure 7:
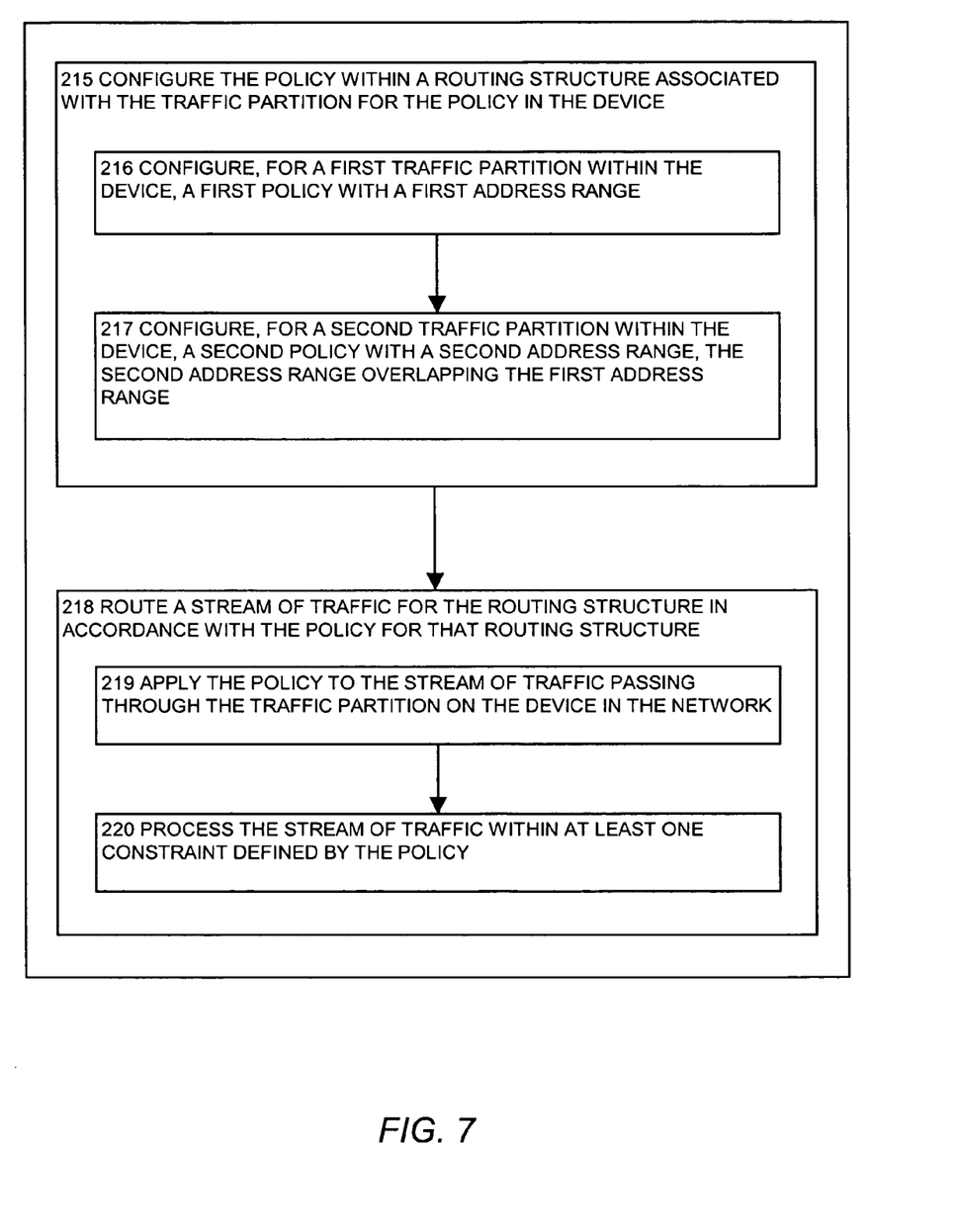
FIG. 7 illustrates a flowchart of a procedure performed by the system of FIG. 1 when the policy providing process configures the policy within a routing structure associated with the traffic partition for the policy in the device, according to one embodiment disclosed herein.

FIG. 7 is a flowchart of the steps performed by the policy providing process 140 when it configures the policy 120-N within routing structure 150-1 associated with the traffic partition 130-1 for the policy 120-1 in the device 125.

In step 215, the policy providing process 140 configures the policy 120-N within a routing structure 150-N associated with the traffic partition 130-N for the policy 120-N in the device 125. In an example configuration, the routing structure 150-N is a virtual routing and forwarding instance. The policy providing process 140 configures the policy 120-N within the virtual routing and forwarding instance (i.e., the routing structure 150-N) on the device 125 according to the policy 120-N received from the policy server 110-N.

In step 216, the policy providing process 140 configures, for a first traffic partition 130-1 within the device 125, a first policy 120-1 with a first address range 155-1. In an example configuration, the first policy 120-1 defines an encryption key and an address range 155-N.

In step 217, the policy providing process 140 configures, for a second traffic partition 130-2 within the device 125, a second policy 120-2 with a second address range 155-2, the second address range 155-2 overlapping the first address range 155-1. In an example configuration, each secured routing structure 150-1 interface may be associated with a unique policy 120-1 and policy server 110-1. In this scenario, the first address range 155-1 may overlap the second address range 155-2.

In step 218, the policy providing process 140 routes a stream of traffic for the routing structure 150-1 in accordance with the policy 120-1 for that routing structure 150-1. In an example configuration, the traffic partition 130-1 is a Virtual Private Network (VPN), and the policy providing process 140 routes the traffic through the VPN (i.e., the traffic partition 130-1) according to the policy 120-1 provided by the policy server 110-1.

In step 219, the policy providing process 140 applies the policy 120-1 to the stream of traffic passing through the traffic partition 130-1 on the device 125 in the network. In an example configuration, as traffic flows through the device 125, the policy 120-1 for each traffic partition 130-1 (i.e., VPN) is applied to the respective traffic.

In step 220, the policy providing process 140 processes the stream of traffic within at least one constraint defined by the policy 120-1. In an example configuration, as traffic flows through the device 125, the constraints defined by the policy 120-1 associated with the respective traffic partition 130-1 (i.e., VPN) are applied to the respective traffic.

In an example configuration the device 125 is a router, the traffic partition 130-1 is a virtual private network (VPN), and the routing structure 150-1 is a virtual routing and forwarding instance (VRF). The policy providing process 140 provides a request for the policy 120-1 from a policy server 110-1 dedicated to providing security processing for that virtual private network, and receives the policy 120-1 from the dedicated policy server 110-1. The policy 120-1 indicates security processing to be applied to the virtual private network (i.e., the traffic partition 130-1) passing through the router (i.e., the device 125). The policy providing process 140 configures the policy 120-N within the virtual routing and forwarding instance (i.e., the routing structure 150-1) associated with the virtual private network (i.e., the traffic partition 130-1) passing through the router (i.e., the device 125). The policy providing process 140 then routes the stream of traffic for the virtual routing and forwarding instance (i.e., the routing structure 150-1) in accordance with the security processing (i.e., the policy 120-1) for that virtual routing and forwarding instance (i.e., the routing structure 150-1).

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. In a device, in a network, a method of providing policies to a first and second traffic partition in the network, the method comprising:

providing a request for a first and second policy from a policy server;

receiving the first policy from the policy server, the first policy indicating processing to be applied to the first traffic partition passing through the device and the first policy defining a first encryption key and first address range within the network;

receiving the second policy from the policy server, the second policy indicating processing to be applied to the second traffic partition passing through the device and the second policy defining a second address range within the network;

configuring, for the first traffic partition within the device, the first policy within a first routing structure associated with the first traffic partition with the first address range;

configuring, for the second traffic partition within the device, the second policy within a second routing structure associated with the second traffic partition with the second address range, the second address range overlapping the first address range;

routing a first stream of traffic for the first routing structure in accordance with the first policy for the first routing structure; and routing a second stream of traffic for the second routing structure in accordance with the second policy for the second routing structure.

2. The method of claim 1 wherein providing a request for the first and second policy from a policy server comprises:

notifying the policy server of the presence of the device; and notifying the policy server that the device is active.

3. The method of claim 2 wherein notifying the policy server that the device is active comprises:

receiving an authentication message from the policy server; and responding to the authentication message from the policy server.

4. The method of claim 1 wherein the policy server is a plurality of policy servers and wherein receiving the first policy from the policy server, the first policy indicating processing to be applied to the first traffic partition passing through the device comprises:

receiving the first policy from at least one policy server of the plurality of policy servers.

5. The method of claim 4 wherein the first policy is a plurality of policies and wherein receiving the first policy from at least one policy server of the plurality of policy servers comprises:

receiving at least one policy from the plurality of policies, the at least one policy received from at least one policy server of the plurality of policy servers.

6. The method of claim 5 wherein receiving at least one policy from the plurality of policies, the at least one policy received from at least one policy server of the plurality of policy servers comprises:

providing an identity of the device onto the network to allow the plurality of policy servers to receive the identity of the device to determine whether the plurality of policy servers have at least one policy from the plurality of policies for that device; and in response, providing the at least one policy for that device to the device, when the identity of the device is associated with the at least one policy from the plurality of policies.

7. The method of claim 1 wherein the first traffic partition is a plurality of traffic partitions and wherein receiving the first policy from the policy server, the first policy indicating processing to be applied to the first traffic partition passing through the device comprises:

receiving a policy dedicated to the plurality of traffic partitions.

8. The method of claim 1 wherein routing a stream of traffic for the first routing structure in accordance with the policy for that routing structure comprises:

applying the first policy to the stream of traffic passing through the first traffic partition on the device in the network; and processing the stream of traffic for the first routing structure within at least one constraint defined by the first policy.

9. In a router, in a network, a method of providing a policy to a traffic partition that is a virtual private network, the policy defining security processing for the virtual private network on the network, the method comprising:

providing a request for the policy from a policy server dedicated to providing security processing for the virtual private network;

Wherein, receiving the policy from the policy server, the policy indicating processing to be applied to the traffic partition passing through the router comprises:

receiving the policy from the dedicated policy server, the policy indicating security processing to be applied to the virtual private network passing through the router;

wherein configuring the policy within a routing structure associated with the traffic partition for the policy in the router comprises:

configuring the policy within a virtual routing and forwarding instance associated with the virtual private network passing through the router; and wherein routing a stream of traffic for the routing structure in accordance with the policy for that routing structure comprises:

routing a stream of traffic for the virtual routing and forwarding instance in accordance with the security processing for that virtual routing and forwarding instance.

10. A computerized device comprising:

a memory;

a processor;

a communications interface;

an interconnection mechanism coupling the memory, the processor and the communications interface;

wherein the memory is encoded with a policy providing application that when executed on the processor provides policies to a first and second traffic partition on the computerized device by performing the operations of:

providing a request for a first and second policy from a policy server;

receiving the first policy from the policy server, the first policy indicating processing to be applied to the first traffic partition passing through the device and the first policy defining a first encryption key and first address range within the network;

receiving the second policy from the policy server, the second policy indicating processing to be applied to the second traffic partition passing through the device and the second policy defining a second address range within the network;

configuring, for the first traffic partition within the device, the first policy within a first routing structure associated with the first traffic partition with the first address range;

configuring, for the second traffic partition within the device, the second policy within a second routing structure associated with the second traffic partition with the second address range, the second address range overlapping the first address range;

routing a first stream of traffic for the first routing structure in accordance with the first policy for the first routing structure; and routing a second stream of traffic for the second routing structure in accordance with the second policy for the second routing structure.

11. The computerized device of claim 10 wherein when the computerized device performs the operation of providing a request for the first and second policy from a policy server, the computerized device performs the operations of:

notifying the policy server of the presence of the device; and notifying the policy server that the device is active.

12. The computerized device of claim 11 wherein when the computerized device performs the operation of notifying the policy server that the device is active, the computerized device performs the operations of:

receiving an authentication message from the policy server; and responding to the authentication message from the policy server.

13. The computerized device of claim 10 wherein the policy server is a plurality of policy servers and wherein when the computerized device performs the operation of receiving the first policy from the policy server, the first policy indicating processing to be applied to the first traffic partition passing through the device, the computerized device performs the operation of:

receiving the first policy from at least one policy server of the plurality of policy servers.

14. The computerized device of claim 13 wherein the first policy is a plurality of policies and wherein when the computerized device performs the operation of receiving the first policy from at least one policy server of the plurality of policy servers, the computerized device performs the operation of:

receiving at least one policy from the plurality of policies, the at least one policy received from at least one policy server of the plurality of policy servers.

15. The computerized device of claim 14 wherein when the computerized device performs the operation of receiving at least one policy from the plurality of policies, the at least one policy received from at least one policy server of the plurality of policy servers, the computerized device performs the operations of:

providing an identity of the device onto the network to allow the plurality of policy servers to receive the identity of the device to determine whether the plurality of policy servers have at least one policy from the plurality of policies for that device; and in response, providing the last least one policy for that device to the device, when the identity of the device is associated with the at least one policy from the plurality of policies.

16. The computerized device of claim 10 wherein the first traffic partition is a plurality of traffic partitions and wherein when the computerized device performs the operation of receiving the first policy from the policy server, the first policy indicating processing to be applied to the first traffic partition passing through the device, the computerized device performs the operation of:

receiving a policy dedicated to the plurality of traffic partitions.

17. A router, in a network, wherein a policy to a traffic partition is a virtual private network, the policy defining security processing for the virtual private network on the network, the router configured to perform the operations of:

providing a request for a policy from a policy server dedicated to providing security processing for the virtual private network in the network, the virtual private network passing through the router;

wherein when the router performs an operation of receiving the policy from the policy server, the policy indicating processing to be applied to the traffic partition passing through the router, the router performs the operation of:

receiving the policy from the dedicated policy server, the policy indicating security processing to be applied to the virtual private network passing through the router; and wherein when the router performs the operation of configuring the policy within a routing structure associated with the traffic partition for the policy in the router, the router performs the operation of:

configuring the policy within a virtual routing and forwarding instance associated with the virtual private network passing through the router; and wherein when the router performs the operation of routing a stream of traffic for the routing structure in accordance with the policy for that routing structure, the router performs the operation of:

routing a steam of traffic for the virtual routing and forwarding instance in accordance with the security processing for that virtual routing and forwarding instance.

18. A computer readable medium encoded with computer programming logic that when executed on a process in a computerized device produces a policy providing process that provides policies by causing the computerized device to perform the operations of:

providing a request for a first and second policy from a policy server;

receiving the first policy from the policy server, the first policy indicating processing to be applied to the first traffic partition passing through the device and the first policy defining a first encryption key and first address range within the network;

receiving the second policy from the policy server, the second policy indicating processing to be applied to the second traffic partition passing through the device and the second policy defining a second encryption key and second address range within the network;

configuring, for the first traffic partition within the device, the first policy within a first routing structure associated with the first traffic partition with the first address range;

configuring, for the second traffic partition within the device, the second policy within a second routing structure associated with the second traffic partition with the second address range, the second address range overlapping the first address range;

routing a first stream of traffic for the first routing structure in accordance with the first policy for the first routing structure; and routing a second stream of traffic for the second routing structure in accordance with the second policy for the second routing structure.

* * * * *

UNITED STATES PATENT AND TRADEMARK OFFICE
CERTIFICATE OF CORRECTION

PATENT NO. : 7,613,826 B2 Page 1 of 1
APPLICATION NO. : 11/350991
DATED : November 3, 2009
INVENTOR(S) : Guichard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Nineteenth Day of October, 2010

David J. Kappos
*Director of the United States Patent and Trademark Office*